(12) United States Patent
Kondo

(10) Patent No.: US 8,503,006 B2
(45) Date of Patent: Aug. 6, 2013

(54) JOB MANAGING APPARATUS PERFORMING PROCESS OF PASSING PRINTED MATERIAL TO RECIPIENT

(75) Inventor: Atsushi Kondo, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1246 days.

(21) Appl. No.: 11/472,458

(22) Filed: Jun. 22, 2006

(65) Prior Publication Data

US 2007/0229882 A1 Oct. 4, 2007

(30) Foreign Application Priority Data

Mar. 30, 2006 (JP) ................. 2006-094499

(51) Int. Cl.
G06F 3/12 (2006.01)
G06K 15/00 (2006.01)

(52) U.S. Cl.
USPC ........ 358/1.15; 358/1.14; 358/1.16; 380/100; 380/200; 380/202; 380/203; 382/232

(58) Field of Classification Search
None
See application file for complete search history.

(56) References Cited

U.S. PATENT DOCUMENTS

| | | | |
|---|---|---|---|
| 7,151,613 B1 * | 12/2006 | Ito | 358/1.15 |
| 7,271,922 B2 | 9/2007 | Yamashita | |
| 7,369,263 B2 | 5/2008 | Azami | |
| 7,474,423 B2 | 1/2009 | Garcia et al. | |
| 2001/0019425 A1 * | 9/2001 | Yamashita | 358/1.15 |
| 2002/0075508 A1 * | 6/2002 | Luman | 358/1.15 |
| 2003/0005330 A1 * | 1/2003 | Berkema et al. | 713/201 |
| 2003/0067621 A1 | 4/2003 | Tanaka | |
| 2003/0227647 A1 * | 12/2003 | Gallacher | 358/1.15 |
| 2004/0073684 A1 * | 4/2004 | Jodra et al. | 709/228 |
| 2004/0190014 A1 | 9/2004 | Ferlitsch | |
| 2005/0108547 A1 * | 5/2005 | Sakai | 713/182 |
| 2005/0231759 A1 * | 10/2005 | Kamijima | 358/1.15 |
| 2006/0115309 A1 * | 6/2006 | Matsunaga | 400/62 |
| 2007/0002365 A1 * | 1/2007 | Pesar et al. | 358/1.15 |

FOREIGN PATENT DOCUMENTS

| | | |
|---|---|---|
| JP | 64-077277 | 3/1989 |
| JP | 04-179367 | 6/1992 |
| JP | 07-162590 A | 6/1995 |

(Continued)

OTHER PUBLICATIONS

Notice of Grounds of Rejection in JP 2006-094499 dated Jun. 16, 2009, and an English Translation thereof.

(Continued)

Primary Examiner — Marivelisse Santiago Cordero
Assistant Examiner — Huo Long Chen
(74) Attorney, Agent, or Firm — Buchanan Ingersoll & Rooney PC

(57) ABSTRACT

A supplier PC transmits a print job together with information on the recipient of the print job and print setting to a printing apparatus. The printing apparatus receives the print job, transmits a notification that print preparation is completed to the recipient PC to accomplish notification. The recipient PC displays pre-print notification, based on the notification contents. The user of the recipient PC views the notification contents, and comes to know that a document addressed to him/her has been transmitted and about to be printed. The recipient PC accepts a change in print setting and the like, and starts printing. Thus, the user of the supplier PC can pass a print to the recipient.

18 Claims, 10 Drawing Sheets

FOREIGN PATENT DOCUMENTS

| | | |
|---|---|---|
| JP | 09-008983 A | 1/1997 |
| JP | 10-058762 A | 3/1998 |
| JP | 11-039112 A | 2/1999 |
| JP | 2000-020270 | 1/2000 |
| JP | 2000-020272 A | 1/2000 |
| JP | 2000-339114 A | 12/2000 |
| JP | 2001-249776 A | 9/2001 |
| JP | 2003-140849 A | 5/2003 |
| JP | 2003-177905 A | 6/2003 |
| JP | 2004-094795 A | 3/2004 |
| JP | 2004-157940 A | 6/2004 |
| JP | 2004-220125 A | 8/2004 |
| JP | 2004-303236 | 10/2004 |
| JP | 2004-362488 | 12/2004 |

OTHER PUBLICATIONS

Notice of Grounds of Rejection issued in the corresponding Japanese Patent Application No. 2006-094499 dated Jan. 5, 2010, and an English Translation thereof.

Office Action (Notice of Grounds of Rejection) from Japanese Patent Office issued in corresponding Japanese Patent Application No. 2006-94499 dated Jul. 26, 2011, with an English translation thereof.

Office Action (Notice of Grounds of Rejection) from Japanese Patent Office issued in corresponding Japanese Patent Application No. 2010-19986 dated Jul. 26, 2011, with an English translation thereof.

Notice of Grounds of Rejection dated Nov. 22, 2011, in corresponding JP Application No. 2006-94499 and English-language translation, 37 pps.

\* cited by examiner

FIG.7

(※1) AVAILABILITY OF NOTIFICATION THAT CAN BE SPECIFIED BY DOCUMENT SUPPLIER PC

| NOTIFICATION TIMING \ NOTIFY PARTY | SUPPLIER PC | RECIPIENT PC |
|---|---|---|
| BEFORE PRINT START | -(a) | ○ |
| AFTER PRINT COMPLETE | ○ | ○ |

(a) NOTIFICATION BEFORE PRINT START IS NOT NECESSARY FOR SUPPLIER PC TRANSMITTING PRINT JOB

FIG.8

(※2) AVAILABILITY OF NOTIFICATION THAT CAN BE SPECIFIED BY DOCUMENT RECIPIENT PC

| NOTIFICATION TIMING \ NOTIFY PARTY | SUPPLIER PC | RECIPIENT PC |
|---|---|---|
| AFTER PRINT COMPLETE | -(b) | ○ |

(b) RECIPIENT PC IS NOT ALLOWED TO CONTROL TIMING OF NOTIFICATION FROM PRINTING APPARATUS TO SUPPLIER PC

FIG.9

| GENERAL SETTING | COMMENT | NOTIFICATION SETTING |

JOB NOTIFY PARTY: KONDO (192.168.0.100)

TIMING OF NOTIFYING JOB RECIPIENT ABOUT JOB STATUS
☒ BEFORE PRINT  ☒ AFTER PRINT

TIMING OF NOTIFYING JOB SUPPLIER ABOUT JOB STATUS
☐ BEFORE PRINT  ☒ AFTER PRINT

ATTACHED IMAGE
○ FIRST PAGE ONLY   ● ALL PAGES

[OK]  [Cancel]

FIG.10

PRINT PRINT JOB OF SATO (192.168.0.10)

PRINTER NAME: KONICAMINOLTA C350
DOCUMENT NAME: FUNCTIONAL SPECIFICATION RevA.doc
COMMENT:
THIS IS THE LATEST SPECIFICATION I HAVE JUST OBTAINED.
PLEASE CHECK ON.

PRINT SETTING:
    N-up : 4 in 1
    Duplex : OFF
    Booklet : OFF

[PREVIEW]
[CHANGE PRINT SETTING]  [PRINT]  [REJECT PRINT]

JOB MANAGING APPARATUS PERFORMING PROCESS OF PASSING PRINTED MATERIAL TO RECIPIENT

This application is based on Japanese Patent Application No. 2006-094499 filed with the Japan Patent Office on Mar. 30, 2006, the entire content of which is hereby incorporated by reference.

BACKGROUND OF THE INVENTION

1. Field of the Invention

The present invention relates to a job managing apparatus, and particularly, to a job managing apparatus that can notify a recipient of a print job about the presence of the print job.

2. Description of the Related Art

Conventionally, image forming apparatuses represented by MFPs (Multi Function Peripherals), copying machines, printers, printing apparatuses and the like are known. An expected situation may be to form an image on a paper using a print function of an image forming apparatus, and passing the printed document to another person.

In this case, generally the following methods a) and b) are employed.
a) Passing the printed document directly to another person.
b) Passing the document as data of a file to another person, so that the file is opened at a PC of the recipient and printed.

In an environment where an image forming apparatus is connected to a network, the image forming apparatus is often installed remotely from users, who therefore often cannot know the status of the image forming apparatus (such as printing being completed, jamming occurring and the like.) In order to solve such problems, applications for displaying the condition of an image forming apparatus on network terminals of users and image forming apparatuses compatible with the applications have been proposed and commercially available.

In connection with such a technique, Japanese Laid-Open Patent Publication No. 11-039112 discloses the following technique. A printing apparatus broadcasts a job status on a network, and an information processing apparatus (PC) updates, if the broadcasted job status belongs to it, the job status based on the received information and manages the same.

Japanese Laid-Open Patent Publication No. 2004-220125 discloses the following network printing system. When an occupying copying job ends, the network printing system transmits a mail to a specified user ID informing the user about the availability of copying so that the user can easily be informed about the end of another person's copy job.

However, when the method of a) is employed, a person of the supplier must go to the place of the recipient, and therefore there is a problem that it is troublesome.

When the method of b) is employed, with a file of large size, there is a problem that load may be applied on the PC receiving the file. Additionally, when the recipient does not have a corresponding application, there is a problem that the recipient cannot open (cannot print) the file.

SUMMARY OF THE INVENTION

The present invention has been made to solve the above-described problems, and an object thereof is to provide a job managing apparatus, a control method of a job managing apparatus, and a control program of a job managing apparatus that are convenient for users.

In order to achieve the object above, according to one aspect of the present invention, a job managing apparatus includes: an accepting portion accepting a print job and information on a recipient of the print job; a printing portion printing based on the print job; and a notifying portion notifying the recipient about presence of the print job, based on the information on the recipient of the print job.

According to another aspect of the present invention, a job managing server includes: an accepting portion accepting a print job and information on a recipient of the print job; and a notifying portion notifying the recipient about presence of the print job, based on the information on the recipient of the print job.

According to the present invention, since a recipient of a print job can be notified about the presence of the print job based on information on the recipient of the print job, a job management apparatus and the like that are convenient for users can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a table representing contents of notification timing setting.

FIG. 8 is a table representing contents of notification timing change.

FIG. 9 shows a setting screen displayed on the recipient PC in step S101 in FIG. 4.

FIG. 10 shows a pre-print notifying screen displayed on the recipient PC in step S301 in FIG. 4.

DESCRIPTION OF THE PREFERRED EMBODIMENTS

Figure 1:
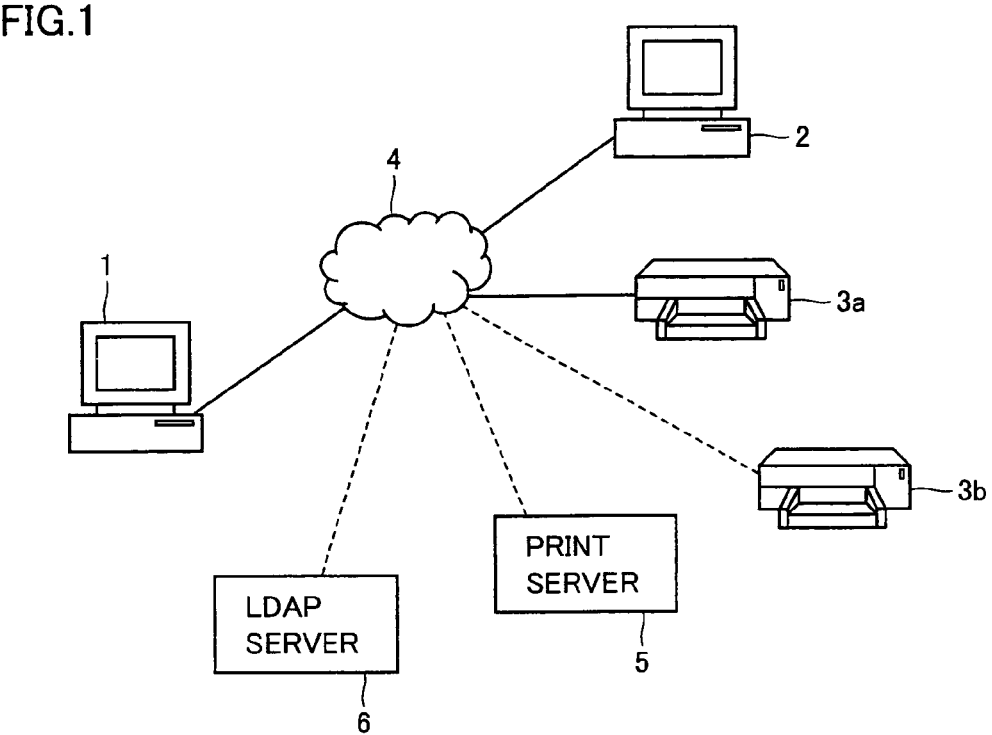
FIG. 1 shows a configuration of a network printing system in one embodiment of the present invention.

Referring to FIG. 1, a printing system is constituted of computers (PCs) 1 and 2 connected to a network 4, printing apparatuses (one type of image forming apparatuses) 3a and 3b, a print server 5, and an LDAP (Lightweight Directory Access Protocol) server 6.

Here, PC 1 is a computer used by a person transmitting a print job to the printing apparatus, and PC 2 is a computer used by a person receiving an output result of the print job.

PC 1 is also referred to as "the supplier PC", and PC 2 is also referred to as "the recipient PC".

In the present embodiment, one user can print a document with the printing apparatus for another person. Here, a notification related to the printing or a preview screen is transmitted to that another person's PC.

Specifically, printing apparatuses 3a and 3b transmit a status of a print job to the supplier PC of the job. Printing apparatuses 3a and 3b transmit the status of the print job also to the recipient PC of the job. Thus, the user of the supplier PC can eliminate step(s) of transmitting a file to another person's PC and/or handing out a printed material, while the user of the recipient PC can eliminate a step of opening the file with an application and execute printing, and the convenience is improved.

However, there is a problem that the user of the recipient PC cannot determine which document to take among the documents output from printing apparatuses 3a and 3b, if the user is simply notified about the status.

In order to solve such a problem, the printing system of the present embodiment notifies the recipient PC also about the contents of the print job.

In the present embodiment, the following operations are performed.
(1) A job is transmitted from the supplier PC to the printing apparatus.
(2) The printing apparatus notifies the supplier PC and the recipient PC (specified by the user of the supplier PC) about a print job status.
(3) The user of the recipient PC receives the notification and goes to the place where the printing apparatus is installed to get the printing result. The user of the supplier PC checks on the completion of printing the job and the recipient PC being notified about the same.

Figure 2:
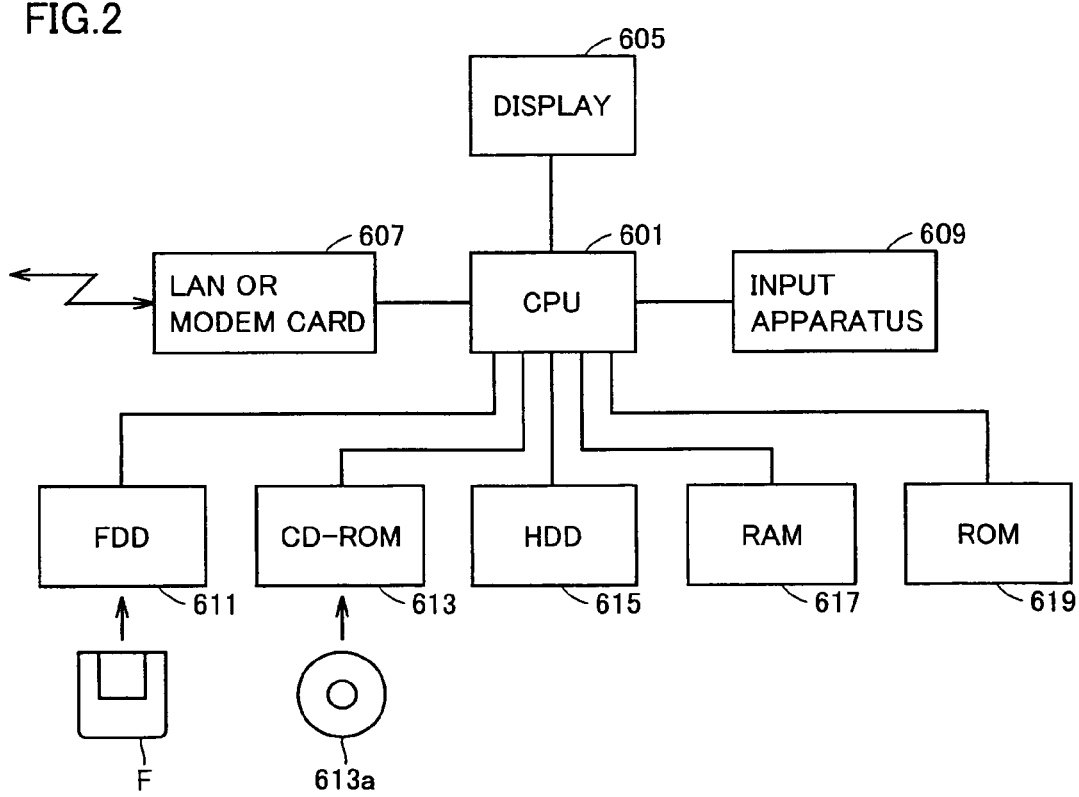
FIG. 2 is a block diagram showing a hardware configuration of one PC or one server in FIG. 1.

FIG. 2 is a block diagram showing a hardware configuration of one PC or one server in FIG. 1.

Referring to the drawing, the PC (or the server) includes a CPU 601 performing control of the entire apparatus, a display 605, a LAN (Local Area Network) card (or a modem card) 607 for connecting to the network or for external communication, an input apparatus 609 constituted of a keyboard, a mouse and the like, a flexible disk drive 611, a CD-ROM drive 613, a hard disk drive 615, an RAM 617, and an ROM 619.

Programs and/or data such as images recorded in a flexible disk F can be read with flexible disk drive 611, and programs and/or data such as images recorded in a CD-ROM 613a can be read with CD-ROM drive 613.

Figure 3:
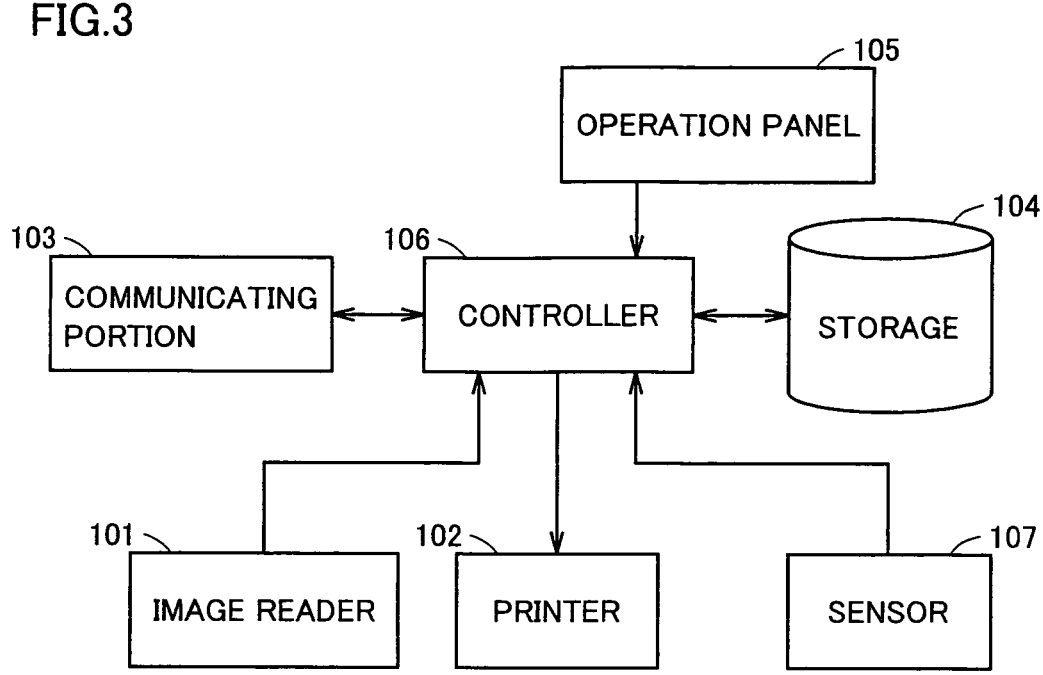
FIG. 3 is a block diagram showing a hardware configuration of the printing apparatus in FIG. 1.

FIG. 3 is a block diagram showing a hardware configuration of the printing apparatus in FIG. 1.

Referring to the drawing, the printing apparatus includes a controller 106 controlling the entire apparatus, an image reader 101 reading an image data from a document, a printer 102 printing an image on a paper, a communicating portion 103 for short-distance radio communication and for connecting the printing apparatus to a network or a telephone line, a storage 104 storing job data and the like, an operation panel 105 that is the interface with the user, and a sensor 107 detecting the remaining quantity of consumables and the like.

Figure 4:
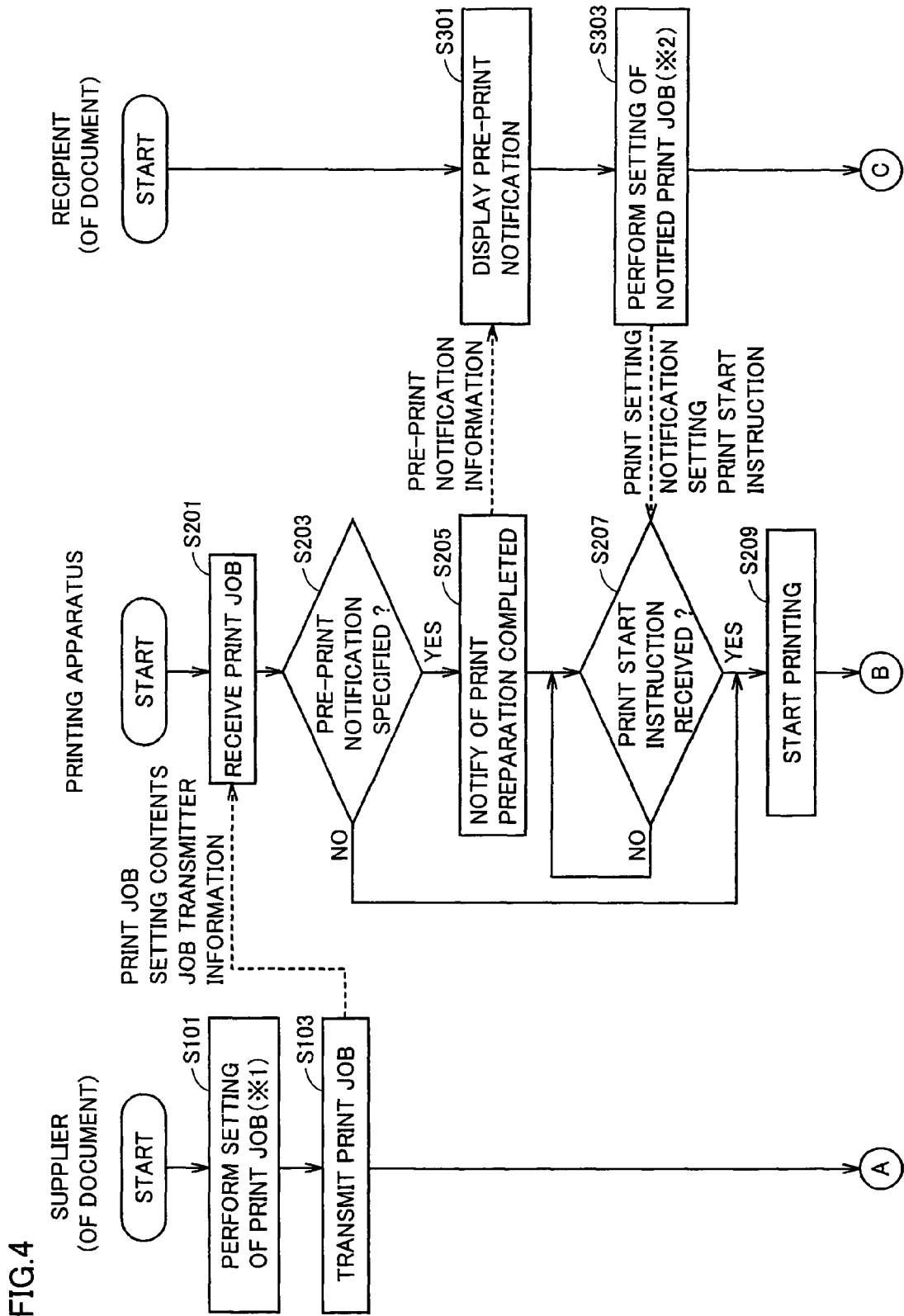
FIGS. 4-6 are flowcharts showing operations of a supplier PC, a printing apparatus, and a recipient PC.
Figure 5:
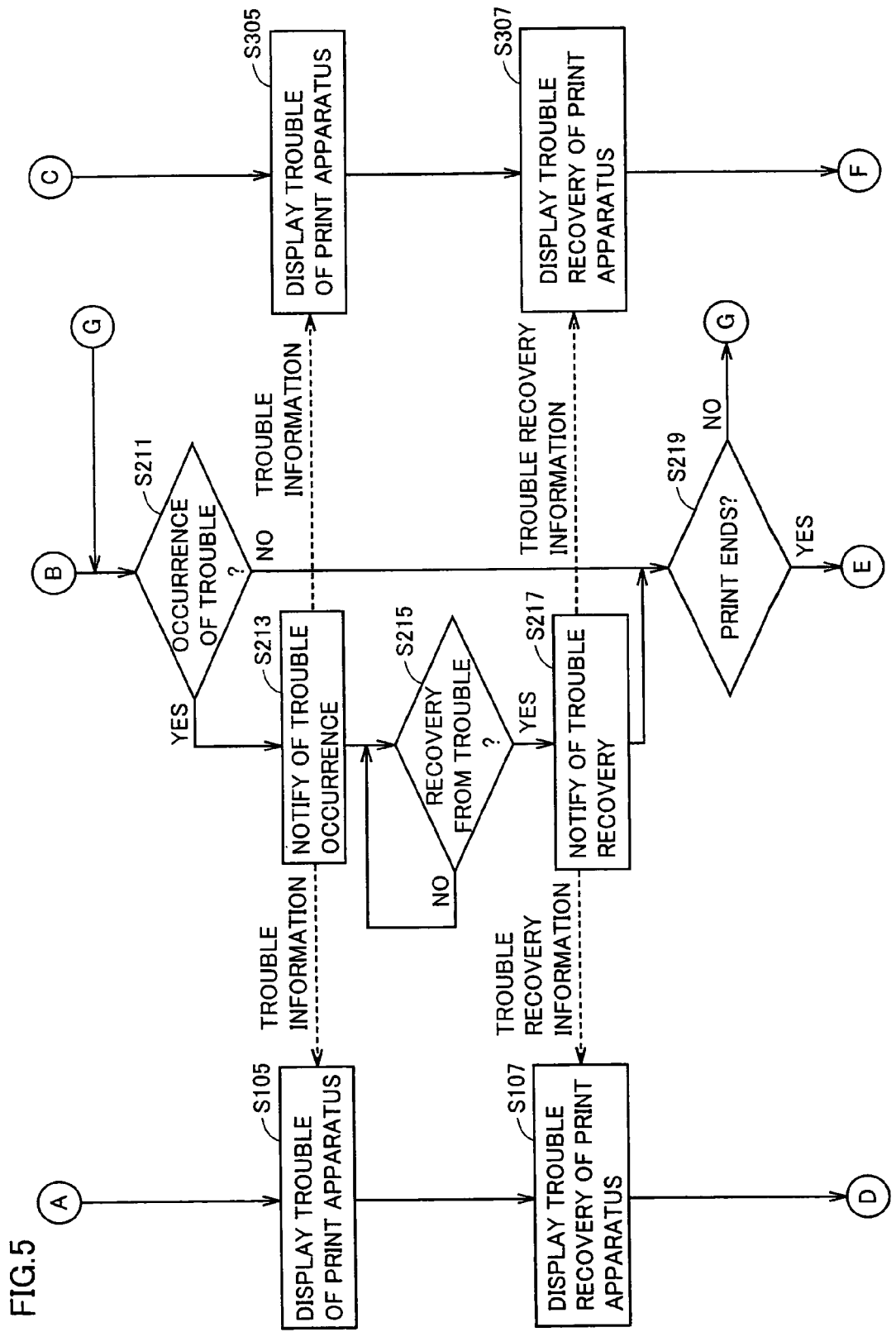
Figure 6:
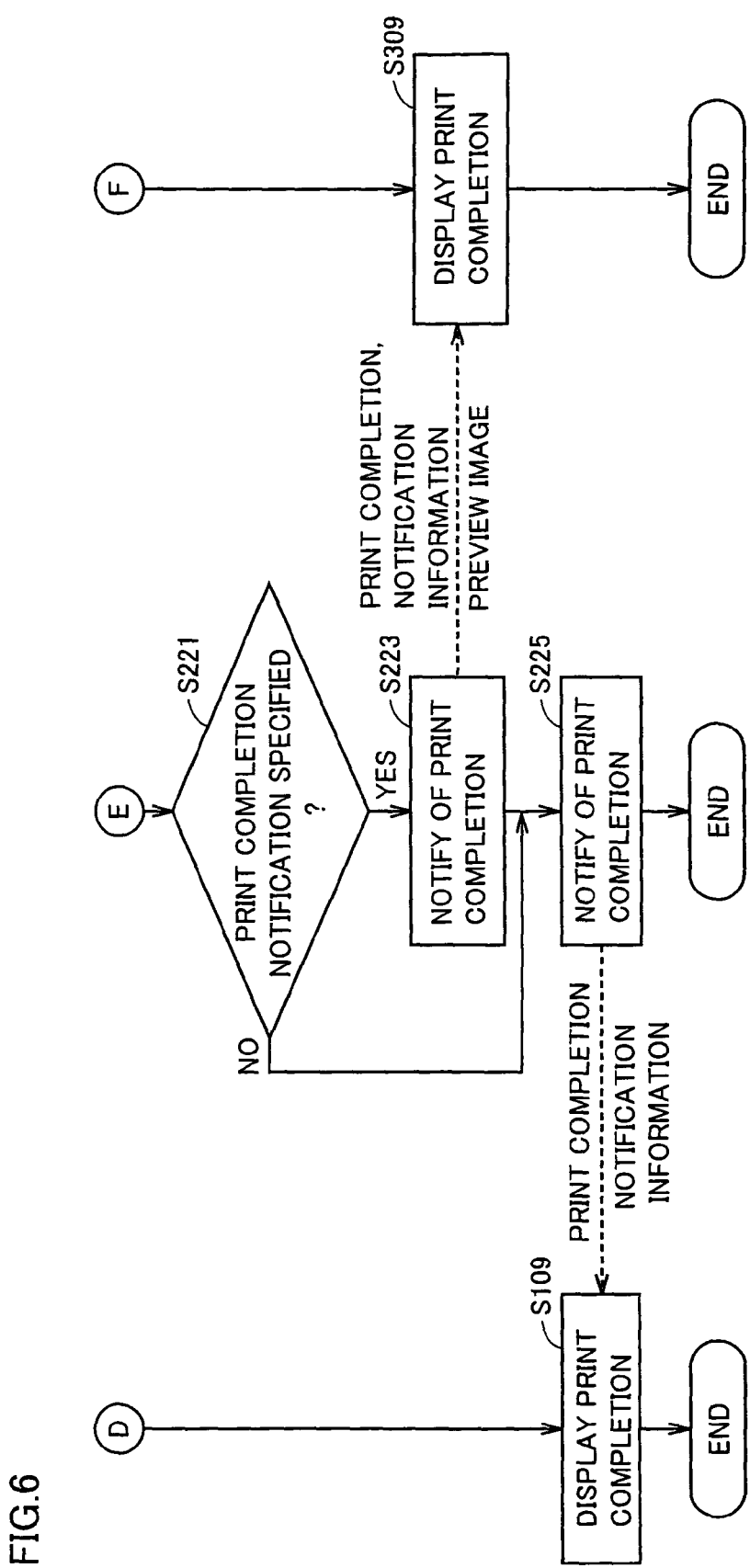

FIGS. 4-6 are flowcharts showing operations of the supplier PC, the printing apparatus and the recipient PC.

Referring to the drawings, in step S101, the supplier PC performs setting of a print job. This setting is based on a user's input. The following setting may be possible.
Notify party of the printing (the recipient PC)
Timing of notification (before print start; after print complete; both, can be specified)
Comments to the notify party
Print setting (setting such as N-up, Duplex, Booklet and the like)
Type of a preview image (attached image) to be transmitted
The printing apparatus to perform the printing It is noted that the print setting is performed with a normal print setting screen. Normally, a document to be printed is specified (opened) before setting the print job, and therefore it is not necessary to specify again the document to be printed in step S101. Further, since the information on the supplier PC is owned by the PC, it is not necessary to be set when printing.

FIG. 7 is a table representing contents of notification timing setting.

In the drawing, "○" represents the item that can be specified, while "−" represents the item that cannot be specified. Here, it is possible to specify so that the recipient PC is notified both before print start and after print complete. On the other hand, it is possible to specify so that the supplier PC is notified only after print complete and not before print start. This is because the user of the supplier PC usually knows that the printing is to be performed by transmitting the print job.

In step S103 in FIG. 4, the supplier PC transmits the print job to the printing apparatus. Here, the contents of the setting made in step S101 and the information on the transmitter of the job are added to the print job.

In step S201, the printing apparatus receives the print job, and processes the print job. In step S203, the print apparatus determines whether pre-print notification has been specified. If it is YES, then in step S205, the printing apparatus transmits a notification of print preparation completed (announcement in advance of print start) to a recipient PC to thereby execute the notification.

It is noted that while "print preparation completed" refers to the time point where rasterizing of the print job is completed, when actually a plurality of jobs are in the print queue, it may be the time point immediately before execution of print (the timing where this print job is executed next, without any other job of higher priority (printing order) present), or it may be it may be the time point where the print job is received by the printing apparatus.

The information transmitted here includes the following.
Identification information on the printing apparatus to perform the printing
Identification information on the supplier PC of the print job (information on the transmitter)
Comments from the supplier PC
Contents of the print job (a preview image of the first page or all pages)
Print setting As to the contents of the print job to be notified about, it is indicated above as a preview image, which is, in the present embodiment, a thumbnail image. This thumbnail image may be created by the supplier PC or by the printing apparatus accepted the print job from the supplier PC.

In step S301, the recipient PC displays the pre-print notification, based on the notification contents. The user of the recipient PC views the notification contents, and comes to know that a document addressed to him/her has been transmitted and about to be printed.

In step S303, the recipient PC accepts from the user of the recipient PC changes in the notification timing and print setting, which have been set at the supplier PC.

FIG. 8 is a table representing contents of notification timing change.

In the drawing, "○" represents the item that can be changed, while "−" represents the item that cannot be changed. Here, it is possible to change only about the availability of a notification to the recipient PC after print complete and it is not possible to change about the notification to the supplier PC after print complete, since it is not preferable that the user of the recipient PC changes the notification setting of the supplier PC that the supplier PC desires.

When the change in the notification timing and print setting is made, it is transmitted to the printing apparatus. Further, an instruction of print start is transmitted from the recipient PC to the printing apparatus in accordance with the user's input.

In step S207, the printing apparatus determines whether the print start instruction is received from the recipient PC, and when it is YES, it starts printing in step S209.

If NO in step S203, it immediately starts printing in step S209.

In step S211 in FIG. 5, the printing apparatus determines whether a trouble occurred. If YES, then the printing apparatus notifies each of the recipient PC and the supplier PC about the trouble occurrence in step S213.

Here, the notification contents include trouble information such as follows.
Identification information on the printing apparatus
Identification information on the supplier PC of the print job
Identification information on the print job (print job name)
Contents of the occurred trouble In step S215, the printing apparatus determines whether the recovery from the trouble is attained. If YES, then in step S217 the printing apparatus notifies each of the recipient PC and the supplier PC about the recovery from the trouble.

Here, the notification contents include trouble recovery information such as follows.
Identification information on the printing apparatus
Identification information on the supplier PC of the print job
Identification information on the print job (print job name)
Contents of the trouble solved The trouble information and/or trouble recovery information is displayed on the recipient PC and the supplier PC in steps S105, S107, S305 and S307.

After the process in step S217, or if NO in step S211, it is determined whether printing ends in step S219. If NO, then the control goes back to step S211.

If YES in step S219, then in step S221 in FIG. 6, whether after print complete notification to the recipient PC has been specified is determined. If YES, then the recipient PC is notified that the printing is completed in step S223. Further, in accordance with the setting, the supplier PC is notified that the printing is completed in step S225.

In steps S309 and S109, the recipient PC and the supplier PC displays that the print is completed, in response to the print complete notification.

The information on print complete notification includes the following.
Identification information on the printing apparatus
Identification information on the supplier PC of the print job
Comments from the user of the supplier PC To the recipient PC, it additionally includes the following.
Contents of the print job (a preview image of the first page or all pages) (the user of the supplier PC knows the contents, and therefore it is not necessary to notify him/her about the contents of the print job.)

As above, notification is performed as necessary at the timing of before print start, at the occurrence of/recovery from a trouble during the process of a print job, and after print complete. After the printing is completed, the user of the recipient PC can be notified of the same and go to get the print result. The transmitter of the job can check on completion of printing the job and the recipient PC notified of the same.

FIG. 9 shows a setting screen displayed on the recipient PC in step S101 in FIG. 4.

Here, job notification setting is performed with GUI (Graphical User Interface) of a print status notifying application. On this screen, the timing of notifying the recipient PC (job notify party) and the supplier PC (job transmitter) of the job status (whether notification is to be performed at each timing of before and after printing), the timing of notifying the supplier PC (job transmitter) of the job status (whether notification is to be performed before and after printing), whether only the first page or all pages of the document is/are to be sent to the recipient PC as an attached image (preview image), can be specified.

In FIG. 9, when the tab of "general setting" is selected, while it is not shown, print setting (setting such as N-up, duplex, booklet and the like) can be made. When the tab of "comments" is selected, setting of comments to the notify party can be made.

FIG. 10 shows a pre-print notifying screen displayed on the recipient PC in step S301 in FIG. 4.

On this screen, information on the supplier PC (here, "SATO (192.168.0.10)"), information on the printer to perform printing, document name, comments from the supplier, and print setting are displayed. When "preview" is pressed on this screen, the image of the attached document is displayed. When "change print setting" is pressed, the current print setting can be changed by the recipient PC. When "print" is pressed, a print start instruction is sent to the printing apparatus and printing is started. When "reject printing" is pressed, printing is not performed.

Figure 11:
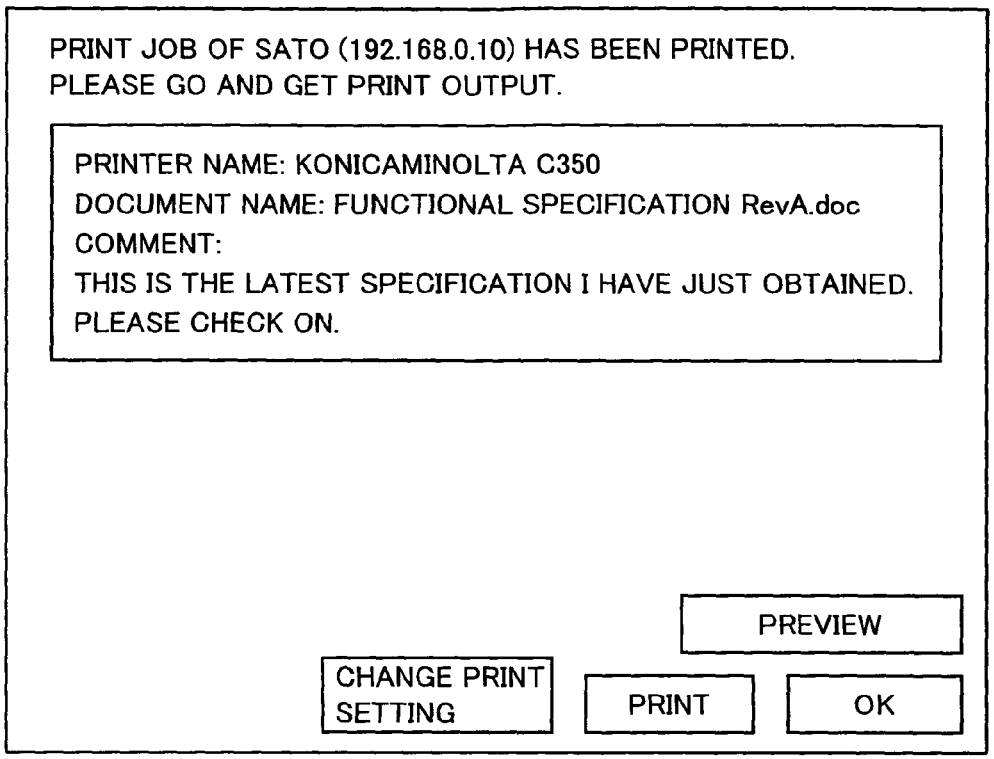
FIG. 11 shows a print complete notifying screen displayed on the recipient PC in step S309 in FIG. 6.

FIG. 11 shows a print complete notifying screen displayed on the recipient PC in step S309 in FIG. 6.

On this screen, information on the supplier PC (here, "SATO (192.168.0.10)"), information on the printer performed printing, document name, and comments from the supplier are displayed. When "preview" is pressed on this screen, the image of the attached document is displayed. When "change print setting" is pressed, the current print setting can be changed by the recipient PC. When "print" is pressed, a print start instruction is sent to the printing apparatus and printing is started again. When "OK" is pressed, the process ends.

Figure 12:
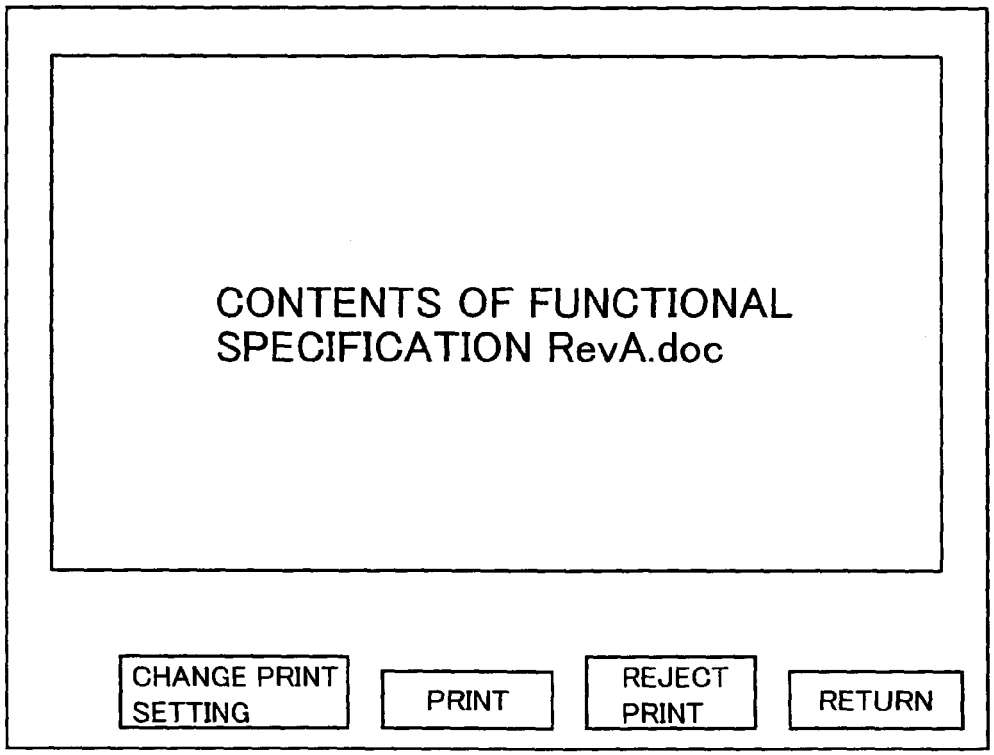
FIG. 12 shows a preview screen when "preview" in FIG. 10 or 11 is pressed.

FIG. 12 shows a preview screen when "preview" in FIG. 10 or 11 is pressed.

On this screen, the attached document is shown and the user of the recipient PC can check on the document.

First Modification

It is noted that job supplier PCs may be registered in the printing apparatus in advance, so that when a job is sent a process can be changed depending on the job supplier. For example, a print job from a PC other than the registered supplier PCs may always cause notification before printing is started, irrespective of the setting at the supplier PC.

Figure 13:
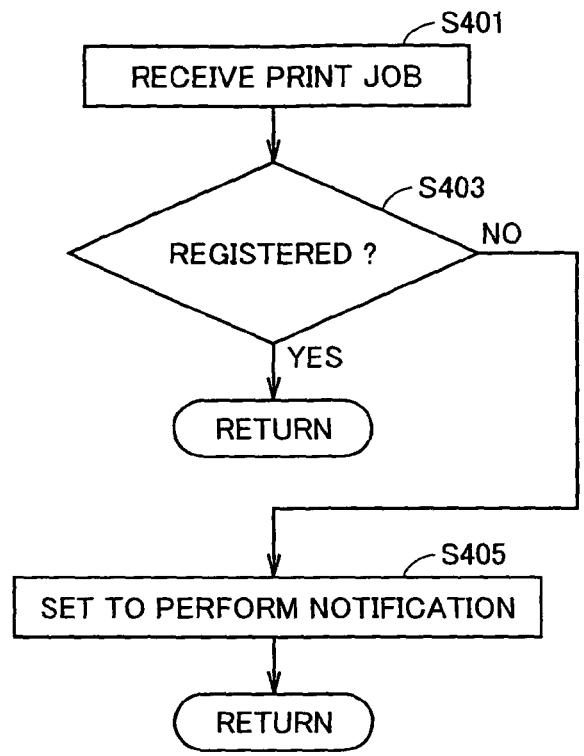
FIG. 13 is a flowchart showing the process executed by the printing apparatus in a first modification.

FIG. 13 is a flowchart showing the process executed by the printing apparatus in a first modification.

Referring to the drawing, in addition to the process described in the above-described embodiment, setting is made so that the printing apparatus on receipt of the print job in step S401 determines in step S403 whether the supplier PC of the job is registered in the apparatus. If YES, then the normal process is performed. If NO, then a notification is forcibly made before printing.

Thus, printing based on an unknown supplier can be performed after it is checked on by the recipient.

Second Modification

Processing of a print job from a supplier PC that is not registered may be rejected.

Figure 14:
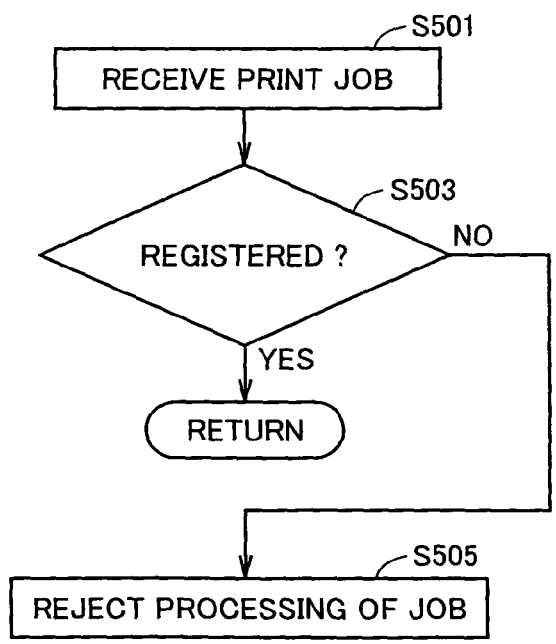
FIG. 14 is a flowchart showing the process executed by the printing apparatus in a second modification.

FIG. 14 is a flowchart showing the process executed by the printing apparatus in a second modification.

Referring to the drawing, in addition to the process described in the above-described embodiment, the printing apparatus on receipt of the print job in step S501 determines in step S503 whether the supplier PC of the job is registered in the apparatus. If YES, then the normal process is performed. If NO, then processing of the print job is rejected.

Thus, printing based on an unknown supplier may not to be performed.

Third Modification

As the notify party of a job status, it may be allowed to specify a mail address of a mobile phone. When a mobile phone is specified as the notify party, setting may be done considering display on the mobile phone, such as reducing the size of an output image to be attached to the display screen size of the mobile phone, deleting the image to be attached, or selecting whether the image should be attached.

Fourth Modification

The printing apparatus may obtain detailed information such as IP addresses of the recipient PC and supplier PC from LDAP server 6 shown in FIG. 1. Thus, the supplier PC can easily manage the information on the recipient PC.

Further, while in the present embodiment the recipient PC is specified as the recipient, the user himself/herself and not the PC may be specified as a recipient. In this case, generally by specifying the mail address of the user and the user receiving through his/her mail, the aforementioned notification can be received. It goes without saying that a user name can be specified in place of a mail address as the recipient, so that the PC is directly notified, based on information on the PC the user currently uses, through the LDAP server or the like.

Fifth Modification

The process performed by the aforementioned printing apparatus can alternatively be performed by print server 5 shown in FIG. 1. In this case, print server 5 receives a print job and passes it to the printing apparatus. The print apparatus notifies print server 5 of print start, trouble, recovery, and print complete. Based thereon, print server 5 notifies the supplier and the recipient.

Sixth Modification

Print server 5 and LDAP server 6 may be caused to operate in cooperation with each other.

Figure 15:
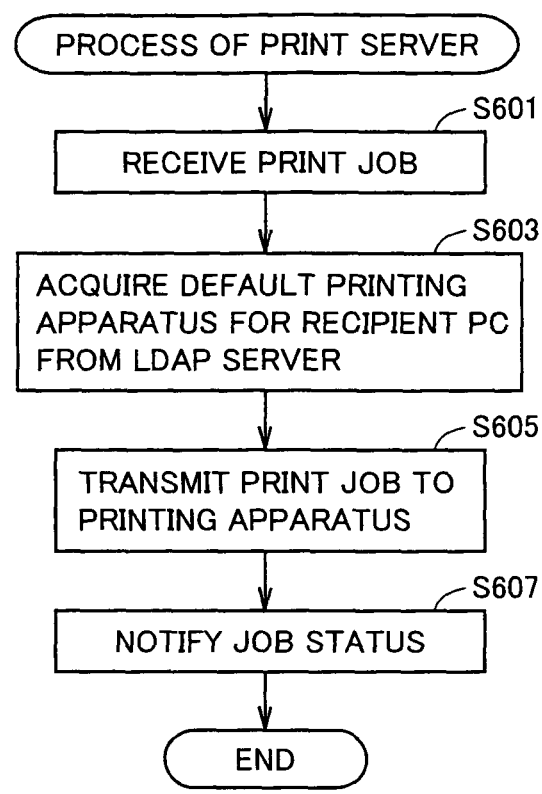
FIG. 15 is a flowchart showing the process in a sixth modification.

FIG. 15 is a flowchart showing the process in a sixth modification.

Referring to the drawing, in step S601, print server 5 receives a print job. In step S603, print server 5 acquires from LDAP server 6 a default printing apparatus that is registered for the recipient PC being set in the print job.

In step S605, print server 5 transmits the print job to the printing apparatus acquired in step S603. In step S607, print server 5 (or the printing apparatus) notifies the recipient PC being set with the print job and the supplier PC of the job status.

In the present modification, as the print server and the LDAP server are caused to operate in cooperation with each other, a print job is automatically transmitted to the printing apparatus that is usually used with the recipient PC. Thus, advantageously, it is not necessary for the user of the supplier PC to be conscious of the printing apparatus to perform printing.

Effects in the Embodiment

As described above, according to the present embodiment, the status of a print job can be transmitted from the printing apparatus, and any notify party other than the job sender (supplier) can be specified. Thus, such an effect is attained that the print job output for another person can be passed efficiently. Further, the convenience is improved by notifying the recipient about the status of the print job.

Note

The process in the above-described embodiment may be executed with software or using hardware circuitry.

It may also be possible to provide a program executing the process in the above-described embodiment, or to provide users with such a program as recorded in a storage medium such as a CD-ROM, a flexible disk, hard disk, an ROM, an RAM, a memory card and the like. The program may be downloaded into the apparatus, through a communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising:
a registering portion for registering at least one computing device in said image forming apparatus, wherein a registered computing device is authorized to transmit print jobs to said image forming apparatus;
a receiving portion for receiving a print job from a first user, said print job including at least (i) information of a recipient corresponding to a second user who receives a printed material obtained by said print job and (ii) a setting of said print job, set by the first user, including at least a layout setting and a setting for timing of notification to the recipient;
a determination portion for determining if a computing device used by the first user is registered in said registering portion;
a notifying portion for notifying said recipient, when said print job is received by said receiving portion, of a presence of said print job based on said information on said recipient of said print job, wherein (i) when said computing device used by said first user is determined to be unregistered, said recipient is notified prior to printing said print job, regardless of the timing of notification setting set by the first user, so that said recipient is prompted to review said print job of said unregistered computing device prior to printing said print job and (ii) when said computing device used by said first user is determined to be registered, said recipient is notified according to the timing of notification setting set by the first user;
a first accepting portion for accepting, from the recipient, a print start instruction relating to said print job after said notifying portion notifies said recipient;
a second accepting portion for accepting, from the recipient, a change of the layout setting of said print job set by the first user; and
a printing portion executing said print job based on the layout setting changed by the recipient in response to an accepted print start instruction.

2. The image forming apparatus according to claim 1, wherein:
the second accepting portion accepts the changed layout setting relating to said print job from said recipient after said notification is done, and
wherein said printing portion executes said print job based on the changed layout setting when said changed layout setting is accepted.

3. The image forming apparatus according to claim 1, wherein said notifying portion notifies a completion of said print job to said recipient after said printing portion completes said print job.

4. The image forming apparatus according to claim 1, wherein said notifying portion also notifies the computing device used by said first user.

5. The image forming apparatus according to claim 4, wherein the notification to said computing device used by the first user to transmit said print job is performed after printing is completed.

6. The image forming apparatus according to claim 1, wherein when notifying, said notifying portion also transmits data of a preview image of said print job.

7. The image forming apparatus according to claim 6, wherein said preview image includes data of a first page or all pages of said print job.

8. The image forming apparatus according to claim 6, wherein said data of said preview image is transmitted only to said recipient.

9. The image forming apparatus according to claim 1, wherein at occurrence of a trouble in said printing portion, said notifying portion notifies about the trouble.

10. The image forming apparatus according to claim 9, wherein at recovery from the trouble, said notifying portion notifies about the trouble recovery.

11. The image forming apparatus according to claim 1, wherein the layout setting of said print job includes one of: (1) a duplex layout of said print job; (2) N-up layout of said print job; or (3) a booklet layout of said print job.

12. The image forming apparatus according to claim 1, wherein the notifying portion sends a notification to a device of the recipient having device attributes such that one or more settings associated with the notification are established in consideration of the device attributes.

13. A control method of an image forming apparatus, comprising:
   registering at least one computing device in said image forming apparatus, wherein a registered computing device is authorized to transmit print jobs to said image forming apparatus;
   receiving a print job from a first user, said print job including at least (i) information of a recipient corresponding to a second user who receives a printed material obtained by said print job and (ii) a setting of said print job, set by the first user, including at least a layout setting and a setting for timing of notification to the recipient;
   determining if a computing device used by the first user is registered in said image forming apparatus;
   notifying the recipient, when said print job is received of a presence of said print job based on said information on said recipient of said print job, wherein when said computing device used by said first user is determined to be an unregistered computing device, said recipient is notified prior to printing said print job, regardless of the timing of notification setting set by the first user, so that said recipient is prompted to review said print job of said unregistered computing device prior to printing said print job and (ii) when said computing device used by said first user is determined to be registered, said recipient is notified according to the timing of notification setting set by the first user;
   accepting a print start instruction relating to said print job from said recipient after said notification by a notifying portion is done;
   accepting, from the recipient, a change of the layout setting of said print job set by the first user; and
   executing said print job based on the changed layout setting in response to an accepted print start instruction.

14. The control method according to claim 13, wherein:
   the accepting of the change of the layout setting of said print job set by the first user includes accepting the change of the layout setting relating to said print job from said recipient after said notification is done, and
   wherein said printing portion executes said print job based on the changed layout setting when said changed layout setting is accepted.

15. The control method according to claim 13, further comprising:
   receiving, from the recipient, a selection for notifying the recipient of a job status of said print job (1) before printing of said print job, (2) after printing of said print job, or (3) before and after printing of said print job.

16. The control method according to claim 15, further comprising:
   receiving, from the recipient, a further selection for determining whether the notification includes (1) only an image of one page of said print job, or (2) images of all pages of said print job.

17. A non-transitory computer readable medium storing computer program instructions, which when executed by a computer of an image forming apparatus causes the computer to execute the steps of:
   registering at least one computing device in said image forming apparatus, wherein a registered computing device is authorized to transmit print jobs to said image forming apparatus;
   receiving a print job from a first user, said print job including at least (i) information of a recipient corresponding to a second user who receives a printed material obtained by said print job and (ii) a setting of said print job, set by the first user, including at least a layout setting and a setting for timing of notification to the recipient;
   determining if a computing device used by the first user is registered in said image forming apparatus;
   notifying the recipient, when said print job is received, of a presence of said print job based on said information on said recipient of said print job, wherein when said computing device used by said first user is determined to be an unregistered computing device, said recipient is notified prior to printing said print job, regardless of the timing of notification setting set by the first user, so that said recipient is prompted to review said print job of said unregistered computing device prior to printing said print job and (ii) when said computing device used by said first user is determined to be registered, said recipient is notified according to the timing of notification setting set by the first user;
   accepting a print start instruction relating to said print job from said recipient after said notification is done;
   accepting, from the recipient, a change of the layout setting of said print job set by the first user; and
   executing said print job based on the changed layout setting in response to an accepted print start instruction.

18. The non-transitory computer readable medium according to claim 17, further comprising:
   the accepting of the change of the layout setting of said print job set by the first user includes accepting the change of the layout setting relating to said print job from said recipient after said notification by a notifying portion is done,
   wherein said printing portion executes said print job based on the changed layout setting when said changed layout setting is accepted.

* * * * *